(12) United States Patent
Jin et al.

(10) Patent No.: US 11,349,172 B2
(45) Date of Patent: May 31, 2022

(54) BATTERY MODULE, BATTERY PACK AND VEHICLE INCLUDING THE SAME

(71) Applicant: LG CHEM, LTD., Seoul (KR)

(72) Inventors: Hee-Jun Jin, Daejeon (KR); Sung-Won Seo, Daejeon (KR); Yoon-Koo Lee, Daejeon (KR); Eun-Ah Ju, Daejeon (KR); Jeong-O Mun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 281 days.

(21) Appl. No.: 16/339,583

(22) PCT Filed: Jul. 12, 2018

(86) PCT No.: PCT/KR2018/007897
§ 371 (c)(1),
(2) Date: Apr. 4, 2019

(87) PCT Pub. No.: WO2019/017644
PCT Pub. Date: Jan. 24, 2019

(65) Prior Publication Data
US 2019/0245171 A1    Aug. 8, 2019

(30) Foreign Application Priority Data

Jul. 18, 2017 (KR) .......................... 10-2017-0091025

(51) Int. Cl.
*H01M 50/20* (2021.01)
*F16B 5/02* (2006.01)
(Continued)

(52) U.S. Cl.
CPC .............. *H01M 50/20* (2021.01); *F16B 5/02* (2013.01); *H01M 50/10* (2021.01); *H01M 50/147* (2021.01)

(58) Field of Classification Search
CPC ........ H01M 50/517; H01M 50/20; F16B 5/02
See application file for complete search history.

(56) References Cited

U.S. PATENT DOCUMENTS 7,625,665 B2 * 12/2009 Jeon .................... B60L 58/26
429/157
9,239,073 B2   1/2016 Taneichi
(Continued)

FOREIGN PATENT DOCUMENTS

DE    102010012930 A1    9/2011
JP    2005-116431 A      4/2005
(Continued)

OTHER PUBLICATIONS

JP2005116431A Original and Translation from Espacenet (Year: 2005).*
(Continued)

*Primary Examiner* — Nathanael T Zemui
(74) *Attorney, Agent, or Firm* — Birch, Stewart, Kolasch & Birch, LLP

(57) ABSTRACT

A battery module including a battery cell assembly having at least one battery cell, a module case accommodating the battery cell assembly and including a first cover plate covering a first side of the battery cell assembly and a second cover plate covering a second side of the battery cell assembly, the second side being different from the first side, and at least one bolting member integrally fastened through the first cover plate and the second cover plate of the module case, wherein each bolting member includes a first portion fastened to the first cover plate and a second portion fastened to the second cover plate, the first and second portions of each bolting member have different diameters.

13 Claims, 8 Drawing Sheets

(51) Int. Cl.
*H01M 50/10* (2021.01)
*H01M 50/147* (2021.01)

(56) References Cited

U.S. PATENT DOCUMENTS

| | | | |
|---|---|---|---|
| 9,620,809 B2* | 4/2017 | Turon Teixidor | H01M 50/209 |
| 2009/0092873 A1 | 4/2009 | Jeong et al. | |
| 2010/0196084 A1* | 8/2010 | Dent | F16B 31/021 |
| | | | 403/2 |
| 2011/0151298 A1 | 6/2011 | Kim | |
| 2013/0236751 A1 | 9/2013 | Seong et al. | |
| 2015/0380778 A1 | 12/2015 | Kim et al. | |
| 2016/0164053 A1* | 6/2016 | Lee | H01M 10/425 |
| | | | 429/151 |
| 2016/0372736 A1 | 12/2016 | Kim et al. | |
| 2017/0200925 A1 | 7/2017 | Seo et al. | |
| 2018/0053921 A1 | 2/2018 | Kim et al. | |

FOREIGN PATENT DOCUMENTS

| | | |
|---|---|---|
| JP | 2007-64258 A | 3/2007 |
| JP | 2008-89174 A | 4/2008 |
| JP | 2011-163364 A | 8/2011 |
| JP | 2013-68300 A | 4/2013 |
| JP | 5879865 B2 * | 3/2016 |
| JP | 2017-68986 A | 4/2017 |
| KR | 10-1998-037515 A | 8/1998 |
| KR | 10-2005-0061794 A | 6/2005 |
| KR | 10-0732949 B1 | 6/2007 |
| KR | 10-2009-0034621 A | 4/2009 |
| KR | 10-2011-0071563 A | 6/2011 |
| KR | 10-2013-0015966 A | 2/2012 |
| KR | 10-2012-0055451 A | 5/2012 |
| KR | 10-2012-0074425 A | 7/2012 |
| KR | 10-1307876 B1 | 9/2013 |
| KR | 10-2013-0123762 A | 11/2013 |
| KR | 10-2015-0138626 A | 12/2015 |
| KR | 10-2016-0024267 A | 3/2016 |
| KR | 10-2016-0071654 A | 6/2016 |
| KR | 10-2016-0129597 A | 11/2016 |

OTHER PUBLICATIONS

KR20130123762A Original and Translation from Espacenet (Year: 2013).*
JP5879865B2 Original and Translation from Espacenet (Year: 2016).*
International Search Report issued in PCT/KR2018/007897 (PCT/ISA/210), dated Oct. 23, 2018.

* cited by examiner

BATTERY MODULE, BATTERY PACK AND VEHICLE INCLUDING THE SAME

TECHNICAL FIELD

The present disclosure relates to a battery module, a battery pack, and a vehicle including the same.

The present application claims priority to Korean Patent Application No. 10-2017-0091025 filed on Jul. 18, 2017 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs), hybrid electric vehicles (HEVs) or golf carts driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery module generally includes a plurality of battery cells and a module case accommodating the battery cells. In the conventional battery module, for the cell swelling control, a plurality of buffer pads disposed between the battery cells in the module case during a module assembling process are added, or a separate pressurizing end plate for pressing the battery cells is added. If the separate pressurizing end plate is used, a jig process is further added to pressurize the end plate. After that, the inner side of the module case is welded to package the inside of the case.

However, in the conventional battery module, due to the addition of components such as the buffer pads or the pressurizing end plate for the cell swelling control, the assembling process of the battery module is complicated, and the assembling time is increased, thereby deteriorating the efficiency of the overall assembling process.

In addition, in the conventional battery module, since the module case is welded, it is difficult to disassemble the module case later, which is disadvantageous in terms of follow-up management.

DISCLOSURE

Technical Problem

Therefore, the present disclosure is directed to providing a battery module, a battery pack, and a vehicle including the same, which may have enhanced assembling process efficiency.

Moreover, the present disclosure is directed to providing a battery module, a battery pack, and a vehicle including the same, which may perform cell swelling control with a simpler structure.

Also, the present disclosure is directed to providing a battery module, a battery pack, and a vehicle including the same, which allows easy follow-up management.

Technical Solution

In one aspect of the present disclosure, there is provided a battery module comprising: a battery cell assembly having at least one battery cell; a module case accommodating the battery cell assembly and including a first cover plate covering a first side of the battery cell assembly and a second cover plate covering a second side of the battery cell assembly, the second side of the battery cell assembly being different from the first side of the battery cell assembly; and at least one bolting member integrally fastened through the first cover plate and the second cover plate of the module case, wherein each bolting member includes a first portion fastened to the first cover plate and a second portion fastened to the second cover plate, the first and second portions of each bolting member have different diameters.

The diameter of the portion of the first portion of each bolting member may be smaller than of a respective second portion.

The first portion of each bolting member is a first fastener screwed to the first cover plate; and the second portion of each bolting member is a second fastener extending from the respective first fastener and is screwed to the second cover plate, each second fastener having a greater diameter than the respective first fastener.

The respective first and second fasteners may have different thread directions.

The thread directions of respective first and second fasteners may be opposite to each other.

The battery cell assembly may include: a plurality of battery cells stacked on one another; and the at least one bolting member may penetrate the plurality of battery cells.

The battery cell assembly may include: a plurality of battery cells stacked on one another; and at least one cell cartridge configured to support the plurality of battery cells, wherein the at least one bolting member penetrates the at least one cell cartridge.

In another aspect of the present disclosure, there is also provided a battery pack comprising: at least one battery module of the former embodiments; a pack case accommodating the at least one battery module and including a first pack plate covering a first side of the battery module and a second pack plate covering a second side of the battery module, the first side of the battery module being different from the second side of the battery module; and at least one pack bolting member integrally fastened through the first pack plate and the second pack plate of the pack case, each pack bolting member includes a first portion fastened to the first pack plate and a second portion fastened to the second pack plate, the first and second portions of each pack bolting member have different diameters.

The diameter of the first portion of each pack bolting member may be smaller than the diameter a respective second portion.

The first portion of each pack bolting member has a different thread direction than the respective second portion of each pack bolting member.

The thread directions of the respective first and second portions of the pack bolting member may be opposite to each other.

In another aspect of the present disclosure, there is also provided a battery pack comprising: at least one battery module having at least one battery cell; a pack case accommodating the at least one battery module and including a first pack plate covering a first side of the battery module and a second pack plate covering a second side of the battery module, the second side of the battery module being different than the first side of the battery module; and at least one pack bolting member integrally fastened through the first pack plate and the second pack plate of the pack case, each pack bolting member includes a first portion fastened to the first pack plate and a second portion fastened to the second pack plate, and the first and second portions of each pack bolt member have different diameters.

In another aspect of the present disclosure, there is also provided a vehicle comprising at least one battery pack according to the above embodiments.

Advantageous Effects

According to various embodiments as above, it is possible to provide a battery module, a battery pack, and a vehicle including the same, which may have enhanced assembling process efficiency.

Moreover, according to various embodiments of the present disclosure, it is possible to provide a battery module, a battery pack, and a vehicle including the same, which may perform cell swelling control with a simpler structure.

Also, according to various embodiments of the present disclosure, it is possible to provide a battery module, a battery pack, and a vehicle including the same, which allows easy follow-up management.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
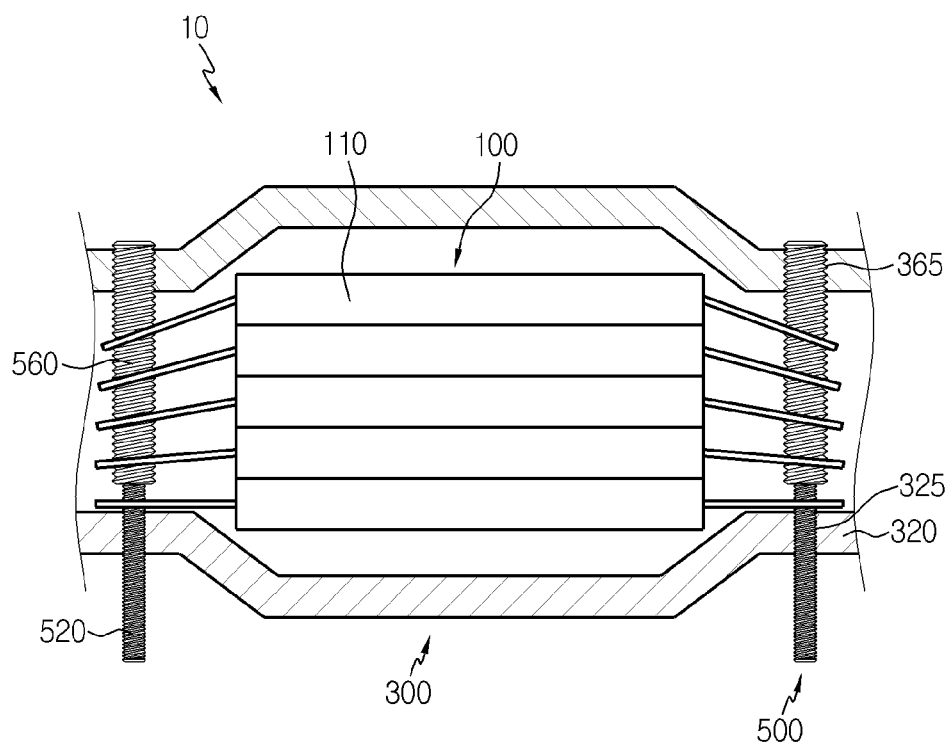
FIG. 1 is a diagram for illustrating a battery module according to an embodiment of the present disclosure.
Figure 2:
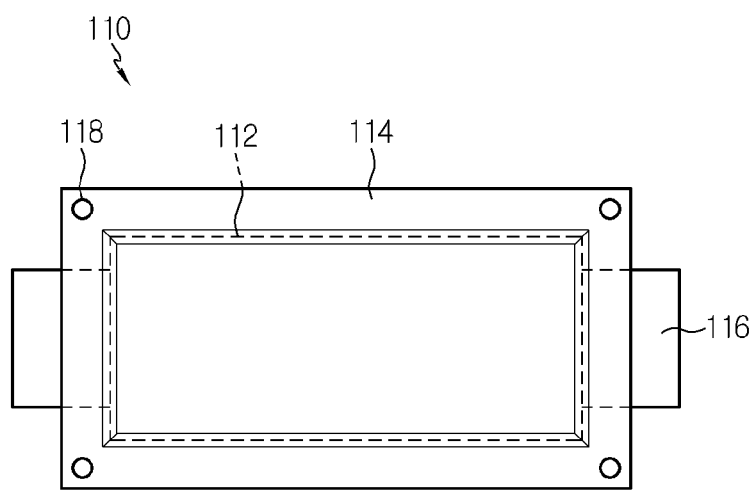
FIG. 2 is a diagram for illustrating a battery cell of a battery cell assembly employed at the battery module of FIG. 1.
Figure 3:
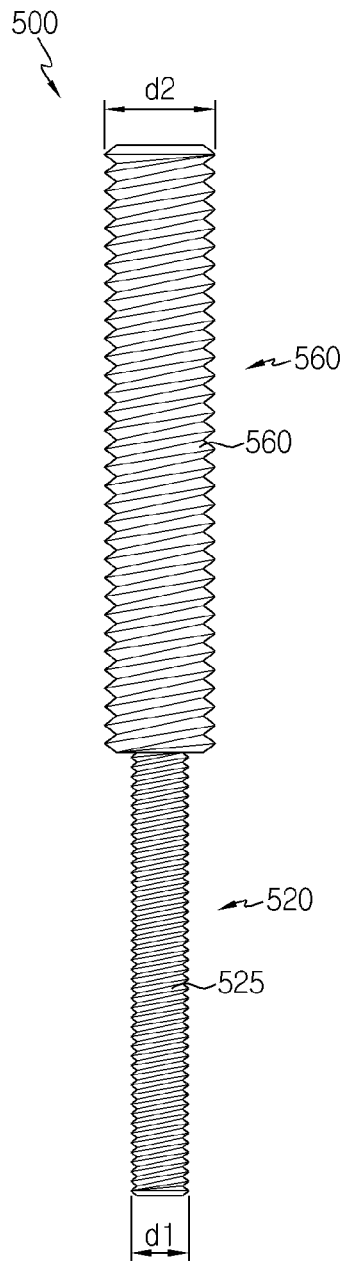
FIG. 3 is a diagram for illustrating a bolting member employed at the battery module of FIG. 1.

FIG. 1 is a diagram for illustrating a battery module according to an embodiment of the present disclosure, FIG. 2 is a diagram for illustrating a battery cell of a battery cell assembly employed at the battery module of FIG. 1, and FIG. 3 is a diagram for illustrating a bolting member employed at the battery module of FIG. 1.

Referring to FIGS. 1 to 3, the battery module 10 may include a battery cell assembly 100, a module case 300, and a bolting member 500.

The battery cell assembly 100 may include at least one battery cell 100 or a plurality of battery cells 110. Hereinafter, this embodiment will be described based on the case where the battery cell assembly 100 includes a plurality of battery cells 110.

The plurality of battery cells 110 may be stacked on one another so as to be electrically connected to each other. The plurality of battery cells 110 may be pouch-type secondary batteries.

Each of the plurality of battery cells 110 may include an electrode assembly 112, a battery case 114, an electrode lead 116, and a perforation hole 118.

The electrode assembly 112 may include a positive electrode plate, a negative electrode plate, and a separator. The electrode assembly 112 is well known in the art and thus not described in detail here.

The battery case 114 may accommodate the electrode assembly 112. For this, the battery case 114 may have an accommodation space for accommodating the electrode assembly 112.

The electrode lead 116 may have a positive electrode lead and a negative electrode lead, and the electrode lead 116 may be electrically connected to the electrode assembly 112 and protrude out of the battery case 114.

The perforation holes 118 may be formed in a rim of the battery case 114 and may be provided in plural. Through the plurality of perforation holes 118, a plurality of bolting members 500, explained later, may be fastened.

The module case 300 forms the appearance of the battery module 10 and may accommodate the battery cell assembly 100. The module case 300 may include a first cover plate 320 and a second cover plate 360.

The first cover plate 320 may cover one side of the battery cell assembly 100. Specifically, in this embodiment, the first cover plate 320 may cover a lower side of the battery cell assembly 100.

The first cover plate 320 may have a coupling hole 325.

The coupling hole 325 may be screwed to a first fastening unit 520 of the bolting member 500, explained later, and may have a size corresponding to the diameter of the first fastening unit 520. The coupling hole 325 may be provided in plural in the first cover plate 320.

The second cover plate 360 may cover the other side of the battery cell assembly 100. Specifically, in this embodiment, the second cover plate 360 may cover an upper side of the battery cell assembly 100.

The second cover plate 360 may have a coupling hole 365.

The coupling hole 365 may be screwed to a second fastening unit 560 of the bolting member 500, explained later, and may have a size corresponding to the diameter of the second fastening unit 560. The coupling hole 365 may be provided in plural in the second cover plate 360.

The bolting member 500 is used for coupling the first cover plate 320 and the second cover plate 360 and may be integrally fastened through the first cover plate 320 and the second cover plate 360 of the module case 300. In the fastening, the bolting member 500 may penetrate the perforation holes 118 of the plurality of battery cells 110 between the first cover plate 320 and the second cover plate 360.

In the bolting member 500, a diameter d1 of a portion 520 coupled to the first cover plate 320 and a diameter d2 of a portion 560 coupled to the second cover plate 360 may be different from each other.

Specifically, in the bolting member 500, the diameter d1 of the portion 520 coupled to the first cover plate 320 may be smaller than the diameter d2 of the portion 560 coupled to the second cover plate 360.

The bolting member 500 may be provided in plural. Hereinafter, this embodiment will be described based on the case where a plurality of the bolting members 500 are provided.

Each of the plurality of bolting members 500 may include a first fastening unit 520 and a second fastening unit 560.

The first fastening unit 520 has a predetermined diameter d1 and may be screwed to the first cover plate 320. Specifically, the first fastening unit 520 is screwed into the coupling hole 325 of the first cover plate 320, and for the screwing, a thread 525 may be formed on the first fastening unit 520.

The second fastening unit 560 extends upward from the first fastening unit 520 and may have the diameter d2 greater than the diameter of the first fastening unit 520. The second fastening unit 560 may be screwed to the second cover plate 360. Specifically, the second fastening unit 560 is screwed into the coupling hole 365 of the second cover plate 360, and for the screwing, a thread 565 may be formed on the second fastening unit 560.

Hereinafter, an assembling process of the battery module 10 including the above components will be described in detail.

Figure 4:
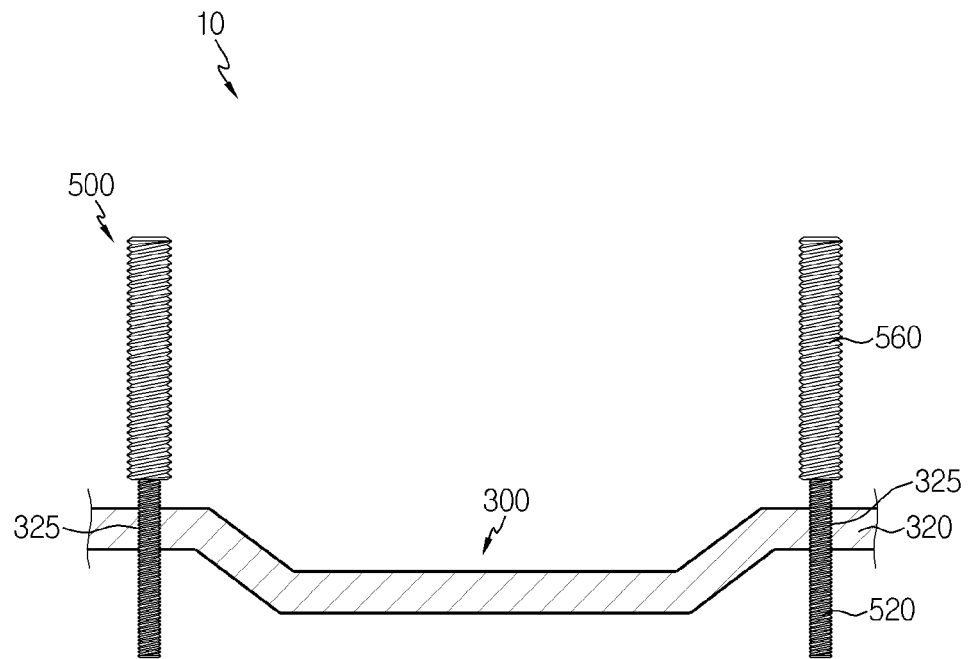
FIGS. 4 to 6 are diagrams for illustrating an assembling process of the battery module of FIG. 1.
Figure 5:
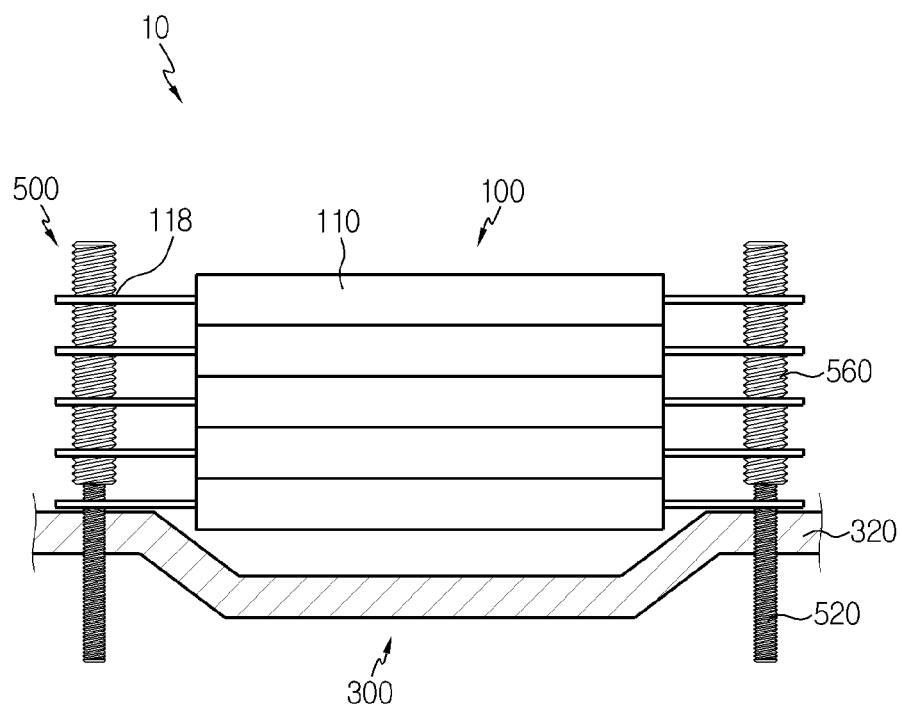
Figure 6:
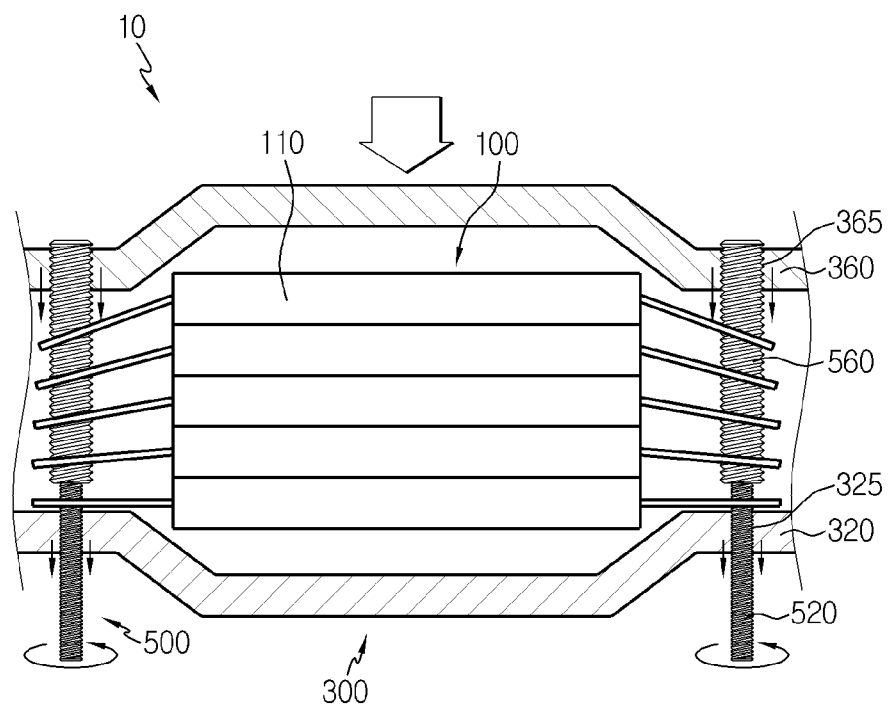

FIGS. 4 to 6 are diagrams for illustrating an assembling process of the battery module of FIG. 1.

Referring to FIG. 4, when the battery module 10 is assembled, a worker may first fasten the bolting members 500 through the first cover plate 320 of the module case 300. Specifically, the first fastening unit 520 of the bolting member 500 may be screwed into the coupling hole 325.

Referring to FIG. 5, the worker or the like may place the battery cell assembly 100 at an upper side of the first cover plate 320 so that the battery cell assembly 100 is supported in the module case 300. At this time, the second fastening units 560 of the bolting members 500 may penetrate the battery cells 110. Specifically, the second fastening units 560 may pass through the perforation holes 118 (see FIG. 2) of the battery cells 110. Accordingly, the battery cell assembly 100 may be additionally supported by the bolting members 500 after the module case 300 is completely assembled.

Referring to FIG. 6, the worker or the like may place the second cover plate 360 of the module case 300 at an upper side of the battery cell assembly 100, and then the bolting members 500 may be fastened to the second cover plate 360.

Specifically, the second fastening units 560 of the bolting members 500 may be screwed into the coupling holes 365 of the second cover plate 360.

Hereinafter, the screwing mechanism of the bolting members 500 will be described in detail.

When the worker or the like rotates the bolting members 500 in one direction for the screw fastening, the second fastening units 560 of the bolting members 500 may be moved further downward than the first fastening units 520. It is because the diameter d2 (see FIG. 3) of the second fastening units 560 is greater than the diameter d1 (see FIG. 3) of the first fastening units 520. In the screw fastening, when the bolting member 500 makes one rotation, the bolting member 500 moves in the vertical direction by a pitch because the second fastening unit 560 having a large diameter may be fastened more than the first fastening unit 520 having a smaller diameter. This is because the pitch that is a gap between threads is greater as the diameter is greater.

Accordingly, when the bolting members 500 are rotated in one direction, the length by which the second cover plate 360 is fastened may be longer than the length by which the first cover plate 320 is fastened. In other words, the second cover plate 360 may be moved further downward than the first cover plate 320 when the bolting members 500 are rotated for screw fastening.

If the bolting members 500 are rotated further for fastening, namely as the bolting members 500 are fastened further to the first and second cover plates 320, 360, the second cover plate 360 is pressed down further than the first cover plate 320.

After that, as the second cover plate 360 is pressed downward according to the fastening of the bolting members 500, the battery cell assembly 100 may be assembled while being pressurized inside the module case 300.

Meanwhile, after the bolting members 500 are completely fastened, the portion of the bolting members 500 protruding above the second cover plate 360 may be used for fastening with a separate structure or part out of the battery module 10.

In this embodiment, since the second cover plate 360 may be pressed further downward by fastening the bolting members 500, the battery cell assembly 100 may be pressed inside the module case 300 simultaneously as the module case 300 is being assembled.

That is, in this embodiment, a pressing structure for cell swelling control of the battery cell assembly 100 may be simultaneously realized just by assembling the module case 300 by means of the bolting members 500.

Accordingly, in this embodiment, a separate component such as a buffer pad, a pressurizing end plate or the like may not be required in the module case 300 for cell swelling control of the battery cell assembly 100.

Thus, the battery module 10 according to this embodiment may simplify the assembling process of the battery module 10 by means of the bolting members 500, and may also reduce the assembling time and significantly improve the overall assembling process efficiency.

Moreover, in the battery module 10 according to this embodiment, since the module case 300 is assembled by means of the bolting members 500 without any additional welding or joining, the battery module 10 may be easily dissembled and reassembled, thereby ensuring more convenient follow-up maintenance.

Figure 7:
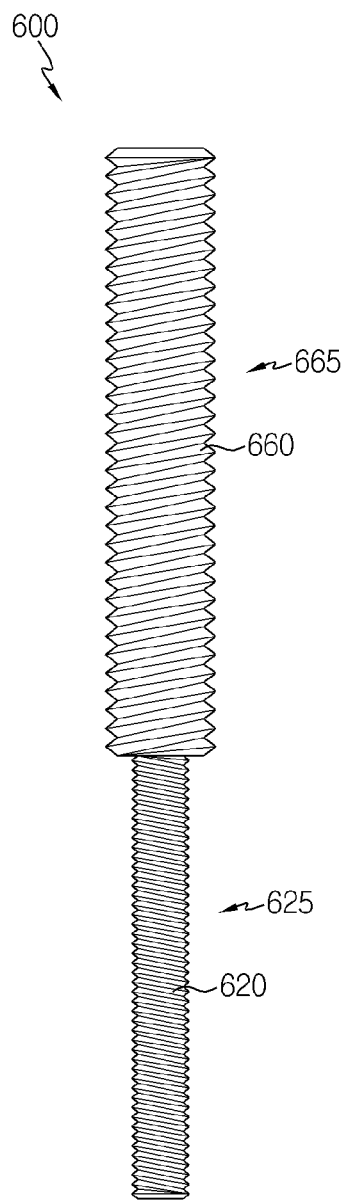
FIG. 7 is a diagram for illustrating a bolting member according to another embodiment of the present disclosure, employed at the battery module of FIG. 1.

FIG. 7 is a diagram for illustrating a bolting member according to another embodiment of the present disclosure, employed at the battery module of FIG. 1.

The bolting member 600 according to this embodiment is similar to the bolting member 500 of the former embodiment, so only features different from the bolting member 500 of the former embodiment will be described in detail.

Referring to FIG. 7, the bolting member 600 may include a first fastening unit 620 and a second fastening unit 660.

The first fastening unit 620 may have a smaller diameter than the diameter of the second fastening unit 660, and a thread 625 of the first fastening unit 620 and a thread 665 of the second fastening unit 660 may have different thread directions, specifically opposite thread directions. For example, the thread direction 625 of the first fastening unit 620 may have a left-hand thread direction, and the thread direction 665 of the second fastening unit 660 may have a right-hand thread direction.

In the bolting member 600, since the threads 625, 665 of the first fastening unit 620 and the second fastening unit 660 have opposite thread directions, the first fastening unit 620 and the second fastening unit 660 may be fastened in opposite directions when being fastened to the first cover plate 320 (see FIG. 1) and the second cover plate 360 (see FIG. 1) of the module case 300 (see FIG. 1). Accordingly, at the fastening, the first cover plate 320 may be pressed upward, and the second cover plate 360 may be pressed downward.

That is, if the bolting member 600 is applied to the battery module 10 (see FIG. 1) of the former embodiment, when the bolting member 600 is fastened, the first cover plate 320 and the second cover plate 360 of the module case 300 may press the battery cell assembly 100 upward and downward. In other words, the battery cell assembly 100 may also be pressed for the cell swelling control by fastening the bolting member 600.

Accordingly, in this embodiment, when the second cover plate 360 is pressed downward, the first cover plate 320 is pressed upward together toward the second cover plate 360, so that the battery cell assembly 100 is pressed further, compared with the former embodiment.

Figure 8:
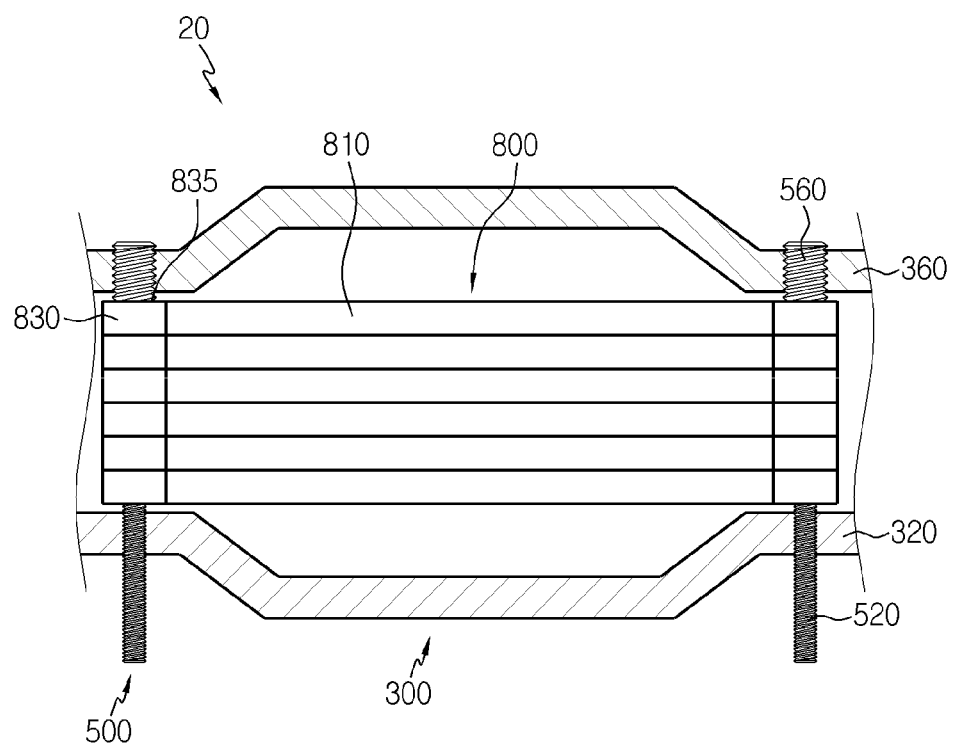
FIG. 8 is a diagram for illustrating a battery module according to another embodiment of the present disclosure.

FIG. 8 is a diagram for illustrating a battery module according to another embodiment of the present disclosure.

The battery module 20 according to this embodiment is similar to the battery module 10 of the former embodiment, so only features different from the former embodiment will be described in detail.

Referring to FIG. 8, the battery module 20 may include a module case 300, a bolting member 500, and a battery cell assembly 800.

The module case 300 may include a first cover plate 320 and a second cover plate 360. The first cover plate 320 and the second cover plate 360 are substantially identical or similar to the former embodiment and thus will not described in detail here.

The bolting member 500 may include a first fastening unit 520 and a second fastening unit 560. The first fastening unit 520 and the second fastening unit 560 are substantially identical or similar to the former embodiment and thus will not described in detail here.

The battery cell assembly 800 may include a plurality of battery cells 810, and at least one cartridge 830 or a plurality of cell cartridges 830 supporting the plurality of battery cells 810. This embodiment will be described based on the case where a plurality of the cell cartridges 830 are provided.

Each of the plurality of cell cartridges 830 may have a perforation hole 835 through which the bolting member 500 passes. Specifically, the second fastening units 560 of the bolting members 500 may penetrate the perforation holes 835 of the plurality of cell cartridges 830 when being fastened.

As described above, the bolting members 500 of this embodiment may also be applied to the battery cell assembly 800 including the cell cartridges 830. Moreover, the bolting member 600 of the former embodiment as well as the bolting member 500 may also be applied.

Figure 9:
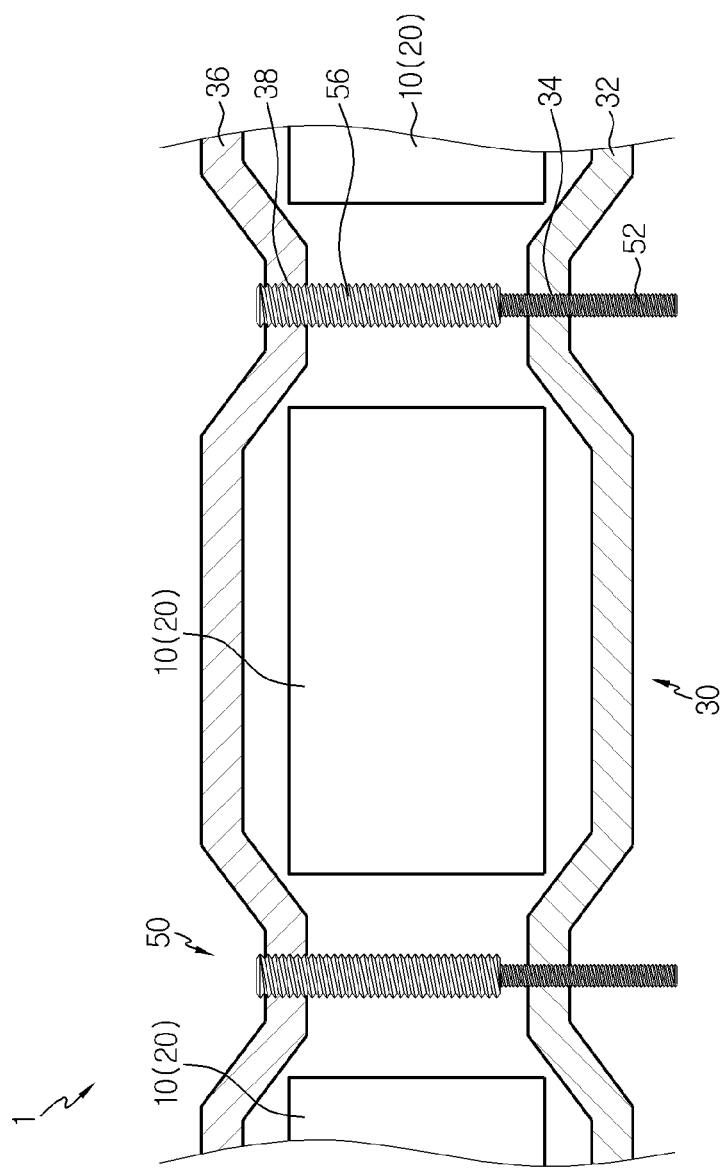
FIG. 9 is a diagram for illustrating a battery pack according to an embodiment of the present disclosure.
Figure 10:
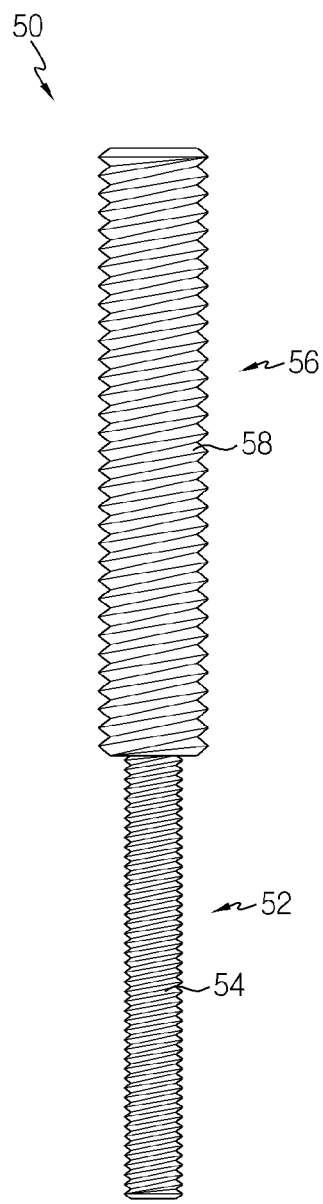
FIG. 10 is a diagram for illustrating a pack bolting member employed at the battery pack of FIG. 9.

FIG. 9 is a diagram for illustrating a battery pack according to an embodiment of the present disclosure, and FIG. 10 is a diagram for illustrating a pack bolting member employed at the battery pack of FIG. 9.

Referring to FIGS. 9 and 10, the battery pack 1 may include a battery module 10, 20, a pack case 30, and a pack bolting member 50.

At least one battery module 10, 20 or a plurality of battery modules 10, 20 may be provided. This embodiment will be described based on the case where the battery modules 10, 20 are provided in plural.

Meanwhile, the battery module of this embodiment may employ another type of battery module, for example at least one battery module that includes at least one another-type battery cell, without being limited to the battery modules of the former embodiments.

The pack case 30 may include a first pack plate 32 and a second pack plate 36.

The first pack plate 32 accommodates the plurality of battery modules 10, 20 and may cover one side of the battery modules 10, 20, namely a lower side of the battery modules 10, 20 in this embodiment. The first pack plate 32 may have a plurality of coupling holes 34 for fastening the pack bolting member 50, explained later.

The second pack plate 36 is coupled to the first pack plate 32 and accommodates the plurality of battery modules 10, 20, and the second pack plate 36 may cover the other side of the battery modules 10, 20, namely an upper side of the battery modules 10, 20 in this embodiment. The second pack plate 36 may have a plurality of coupling holes 38 for fastening the pack bolting member 50, explained later.

The pack bolting member 50 is used for coupling the first pack plate 32 and the second pack plate 36 and may be integrally fastened through the first pack plate 32 and the second pack plate.

In the pack bolting member 50, a portion 52 fastened to the first pack plate 32 and a portion 56 fastened to the second pack plate 36 may have different diameters from each other, similar to the bolting member 500 of the former embodiment.

Specifically, in the pack bolting member 50, the diameter of the portion 52 fastened to the first pack plate 32 may be smaller than the diameter of the portion 56 fastened to the second pack plate 36, similar to the bolting member 500 of the former embodiment.

In detail, the pack bolting member 50 may include a first fastening unit 52 and a second fastening unit 56 having a larger diameter than the first fastening unit. The first fastening unit 52 may have a thread 54 and the second fastening unit 56 may have a thread 58. That is, the pack bolting member 50 may be provided in a form corresponding to the bolting member 500 of the former embodiment.

Accordingly, the battery pack 1 of this embodiment may press the battery modules 10, 20 together inside the pack case 30 only by fastening the pack bolting member 50 to the pack case 30.

By using the pack bolting member 50, it is possible to improve the efficiency of the assembling process of the battery pack 1, simply cell swelling control, and facilitate easy follow-up management.

Meanwhile, in the pack bolting member, the portion coupled to the first pack plate and the portion coupled to the second pack plate may have different thread directions, similar to the bolting member 600 of the former embodiment.

Specifically, the portion of the pack bolting member fastened to the first pack plate and the portion thereof fastened to the second pack plate may have opposite thread directions, similar to the bolting member 600 of the former embodiment.

According to various embodiments as above, it is possible to provide the battery module 10, 20, the battery pack 1, and a vehicle including the same, which may have enhanced assembling process efficiency.

Moreover, according to various embodiments of the present disclosure, it is possible to provide the battery module 10, 20, the battery pack 1, and a vehicle including the same, which may perform cell swelling control with a simpler structure.

Also, according to various embodiments of the present disclosure, it is possible to provide the battery module 10, 20, the battery pack 1, and a vehicle including the same, which allows easy follow-up management.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module comprising:
a battery cell assembly having at least one battery cell;
a module case accommodating the battery cell assembly and including a first cover plate covering a first side of the battery cell assembly and a second cover plate covering a second side of the battery cell assembly, the second side of the battery cell assembly being different from the first side of the battery cell assembly; and
at least one bolting member integrally fastened through the first cover plate and the second cover plate of the module case,
wherein the at least one bolting member is a single piece member,
wherein the at least one bolting member includes a first portion having external threads fastened to the first cover plate and a second portion having external threads fastened to the second cover plate, and
wherein the first and second portions of the at least one bolting member have different diameters.

2. The battery module according to claim 1,
wherein the diameter of the first portion of the at least one bolting member is smaller than the diameter of the second portion.

3. The battery module according to claim 2,
wherein the first portion of the at least one bolting member is a first fastener screwed to the first cover plate; and
wherein the second portion of the at least one bolting member is a second fastener extending from the first fastener and is screwed to the second cover plate.

4. The battery module according to claim 3,
wherein the first and second fasteners have different thread directions.

5. The battery module according to claim 4,
wherein the thread directions of the first and second fasteners are opposite to each other.

6. The battery module according to claim 1,
wherein the battery cell assembly includes a plurality of battery cells stacked on one another, and
wherein the at least one bolting member penetrates the plurality of battery cells.

7. The battery module according to claim 1,
wherein the battery cell assembly includes:
a plurality of battery cells stacked on one another; and
at least one cell cartridge configured to support the plurality of battery cells,
wherein the at least one bolting member penetrates the at least one cell cartridge.

8. A battery pack comprising:
at least one battery module defined in claim 1;
a pack case accommodating the at least one battery module and including a first pack plate covering a first side of the battery module and a second pack plate covering a second side of the battery module, the first side of the battery module being different from the second side of the battery module; and
at least one pack bolting member integrally fastened through the first pack plate and the second pack plate of the pack case,
wherein the at least one pack bolting member is a single piece member,
wherein the at least one pack bolting member includes a first portion fastened to the first pack plate and a second portion fastened to the second pack plate, and
wherein the first and second portions of the at least one pack bolting member have different diameters.

9. The battery pack according to claim 8,
wherein the diameter of the first portion of the at least one pack bolting member is smaller than the diameter of the second portion.

10. The battery pack according to claim 8,
wherein the first portion of the at least one pack bolting member has a different thread direction than the second portion.

11. The battery pack according to claim 10,
wherein the thread directions of the first and second portions of the at least one pack bolting member are opposite to each other.

12. A battery pack comprising:
at least one battery module having at least one battery cell;
a pack case accommodating the at least one battery module and including a first pack plate covering a first side of the battery module and a second pack plate covering a second other side of the battery module, the second side of the battery module being different than the first side of the battery module; and
at least one pack bolting member integrally fastened through the first pack plate and the second pack plate of the pack case,
wherein the at least one pack bolting member is a single piece member,
wherein the at least one pack bolting member includes a first portion having external threads fastened to the first pack plate and a second portion having external threads fastened to the second pack plate, and
wherein the first and second portions of the at least one pack bolt member have different diameters.

13. A vehicle comprising at least one battery pack defined in claim 8.

* * * * *